Patented May 27, 1924.

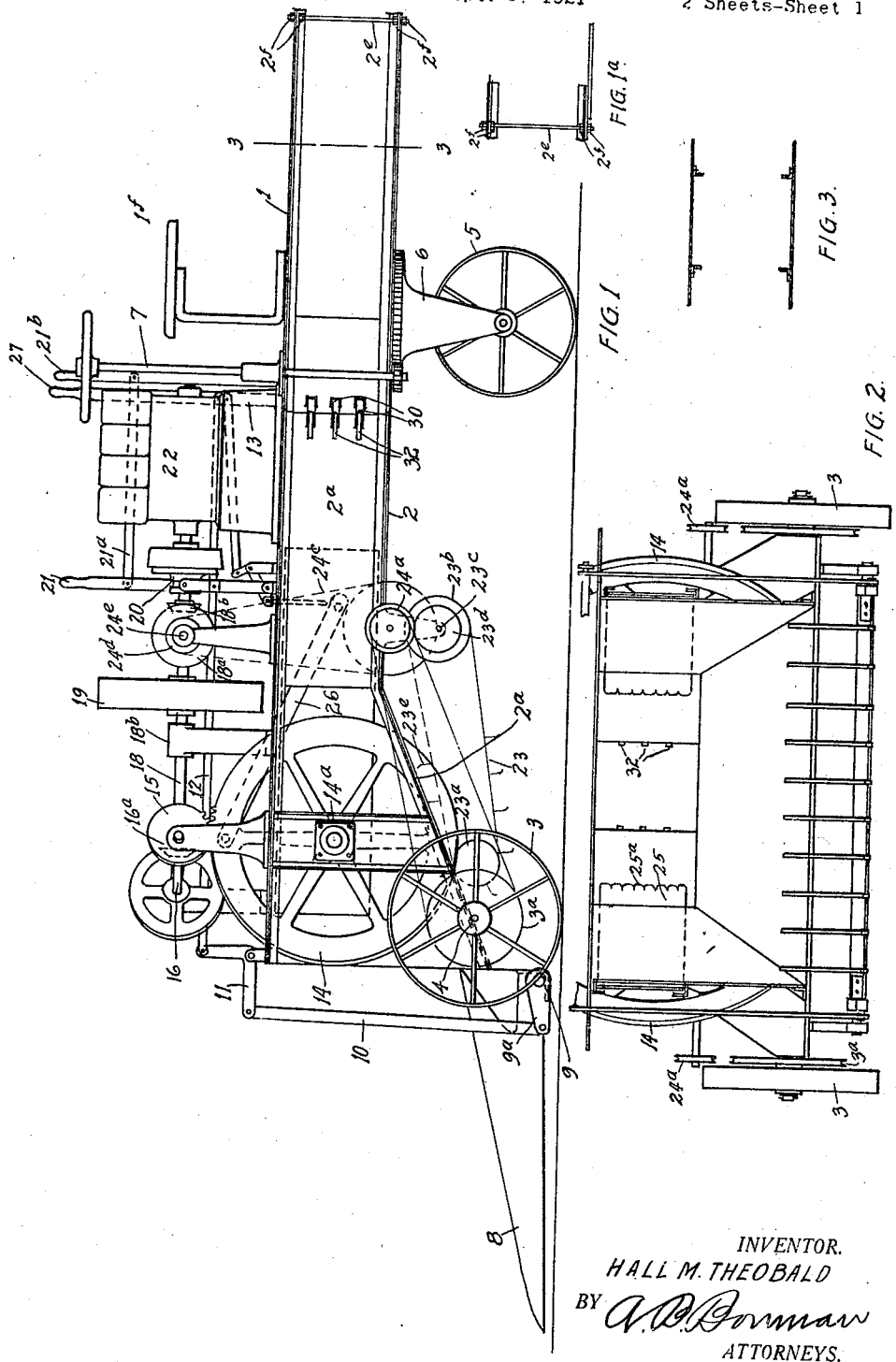

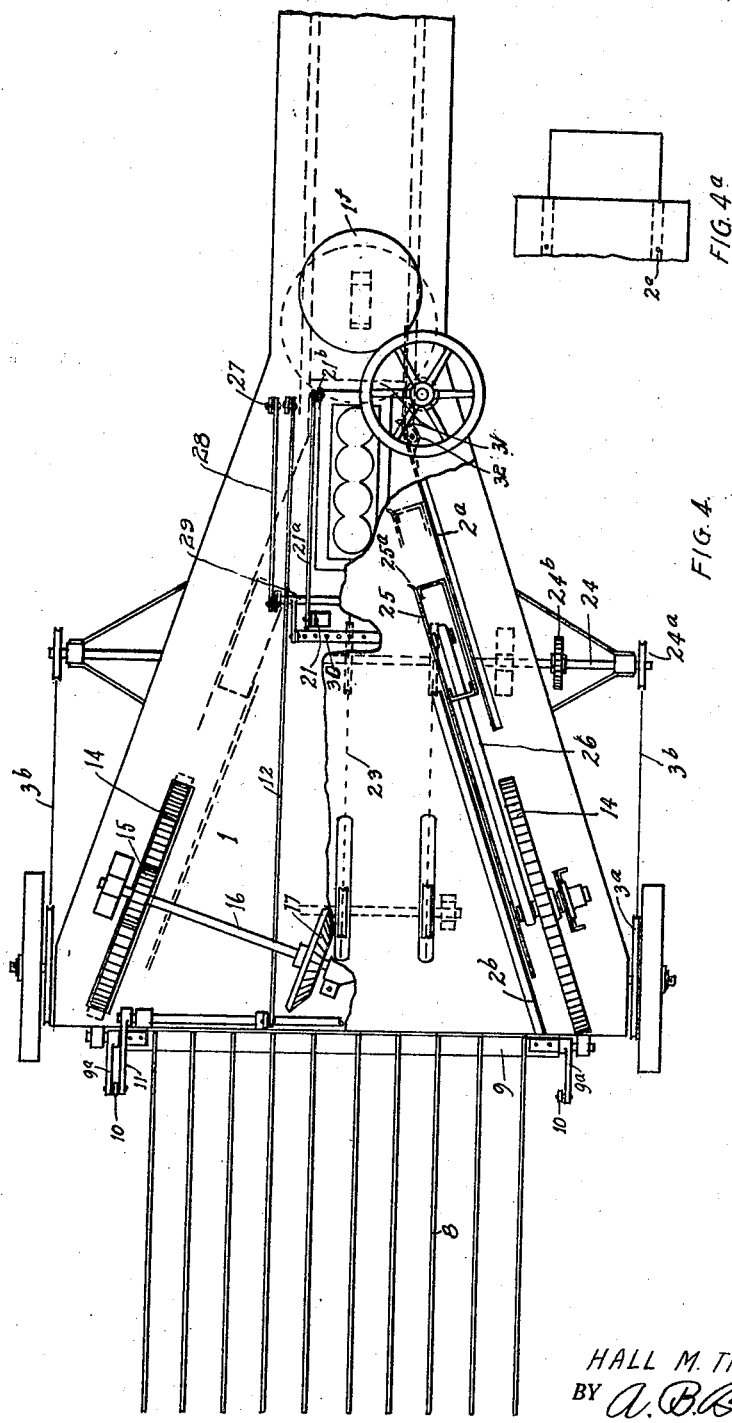

1,495,276

UNITED STATES PATENT OFFICE.

HALL M. THEOBALD, OF CALIPATRIA, CALIFORNIA.

HAY-BALING PRESS.

Application filed September 6, 1921. Serial No. 498,806.

*To all whom it may concern:*

Be it known that I, HALL M. THEOBALD, a citizen of the United States, residing at Calipatria, in the county of Imperial and State of California, have invented a certain new and useful Hay-Baling Press, of which the following is a specification.

My invention relates to hay baling presses and the objects of my invention are: first, to provide a hay baling press which operates under its own power and gathers the hay from the field either as cut or in windrows; second, to provide a hay baling press of this class in which the hay is conducted to the proper position and pressed by the power of the traction of the vehicle when moving over the ground; third, to provide a novelly constructed hay baling press; fourth, to provide a hay baling press which automatically gathers the hay from the ground and automatically feeds it to the press; fifth, to provide a hay baling press of this class which operates automatically for raking the hay from the ground and baling the same and only requires the assistance of two or three workmen; sixth, to provide a hay baling press of this class which is automatic in its action throughout except the tying of the wire around the pressed hay and seventh, to provide a hay baling press of this class which is simple and economical of construction, automatic in its action and easy to operate in accordance with its efficiency.

With these and other objects in view as will appear hereinafter my invention consists of the certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a side elevational view of my hay baling press; Fig. 1$^a$ is a fragmentary side elevational view of the rear extended end of said press; Fig. 2 is a front view of a fragmentary portion thereof; Fig. 3 is a sectional view through 3—3 of Fig. 1; Fig. 4 is a top or plan view of the press showing some of the portions broken away to facilitate the illustration, and Fig. 4$^a$ is a fragmentary plan view of the extended end of the press.

Similar characters of reference refer to similar parts and portions throughout the several views of the drawings.

The upper main plate 1, base plate 2, traction wheels 3, axle 4, steering wheel 5, steering wheel support 6, steering shaft 7, rake teeth 8, rake teeth supporting shaft 9, rake teeth operating bar 10, bell crank member 11, rod 12, lever 13, spur gears 14, spur pinions 15, shafts 16, bevel gears 17, main drive shaft 18, fly wheel 19, clutch 20, clutch operating lever 21, engine 22, conveyers 23, intermediate shaft 24, packer members 25, connecting rods 26, lever 27, rod 28 and hay retarding members 29 and 30 constitute the principal parts and portions of my hay baling press structure.

The plate 1 is preferably a horizontal plate of Y-outline shape as shown best in Fig. 4 of the drawings and the plate 2 is similarly shaped except that at its front end at 2$^a$ it is turned downwardly on an incline. Between these plates 1 and 2 the space is closed at the sides by means of side plates 2$^a$ and 2$^b$, thus providing a tapering box shaped enclosure for the hay to be conducted through. These plates 1 and 2 are spaced relatively to each other and reinforced at their extended ends by spacer rods 2$^e$ and nuts 2$^f$. The front end of this member 2 is supported upon an axle 4 which extends across the lower side thereof and on each end of this axle 4 is mounted a wheel 3. These wheels 3 are the traction wheels for propelling the baling press. Secured adjacent these wheels on each side are sheaves 3$^a$ over which are mounted belts 3$^b$ and these belts are mounted on sheaves 24$^a$ secured on the opposite ends of the intermediate shaft 24. Secured on this intermediate shaft 24 is a sprocket wheel 24$^b$ on which is mounted a chain 24$^c$ which extends upwardly to another sprocket 24$^d$ which is mounted on a shaft 24$^e$ and mounted on this shaft is a beveled gear 18$^a$ which meshes with a small pinion 18$^b$ on the main shaft 18 thus providing means for driving the traction wheels 3 through the intermediate shaft. The rake teeth 8 are positioned in spaced relation on their edges as shown best in Figs. 1 and 4 of the drawings. They are supported at their inner ends on the shaft 9 thus providing for their pivotal mounting so that they may be raised and lowered at their outer extended ends. It will be noted that their upper surfaces are inclined as shown best in Fig. 1 of the drawings so that the hay when picked up by the rake teeth rapidly raises on the teeth with the movement of the machine forwardly. Secured to this shaft 9 which is pivotally supported upon the lower edge of the front end of the plate 2 are the arm members 9ª, one on each end, which extend forwardly some distance and pivotally connected with the extended ends are the bars 10 which extend in an upright position and connect with the normally horizontal arms of the bell crank 11 which bell crank is pivotally mounted intermediate its ends on supports on the front end of the plate 1. The other vertical member of said bell crank is pivotally connected with a rod 12 which extends backwardly and is pivotally connected with a lever 15 which is the operating lever for raising and lowering the front end of the rake teeth 8. Pivotally mounted in each side and extending through slots in the plates 1 and 2 and positioned on an angle are the gears 14 which are supported upon the upright support 14ª. These bevel gears 14 are operated by means of spur pinions 15 which are mounted on the shaft 16 and upon the other end of said shafts 16 are the bevel gears 17 which mesh with a bevel gear secured on the main shaft 18. This shaft 18 is supported in the middle of the machine and supported on the plate 1 by means of a journal support 18ᵇ. This main shaft is also provided with a clutch 20 which is operated by the clutch lever 21. Pivotally connected to this clutch lever 21 is a bar 21ª which extends backwardly and pivotally connects with another lever 21ᵇ which latter lever is contiguous to the operator's seat 1ᶠ. Pivotally connected to the gear wheel 14 on opposite sides are the connecting rods 26 forming a crank wheel of said gears 14 and the opposite ends of these connecting rods 26 are pivotally connected to the packer members 25 which packer members are reciprocably mounted between the plates 1 and 2 and parallel with the gears 14 and supported in slides on the members 26. They are provided on their inner ends with a plurality of prongs 25ª which are adapted to engage the hay in their reciprocation and causes it to move backwardly in the space between the plates 1 and 2. Mounted in the plates 2 at the lower side thereof at the front end are conveyers 23. In this case I have shown three. These conveyers are operated by means of sprockets 23ª and 23ᵇ which sprockets are secured to shafts 23ᶜ and mounted on this shaft 23ᶜ is a gear 23ᵈ which meshes with the gear 24ª on the intermediate shaft 24, thus providing means for operating the conveyers 23. Mounted on the sprockets 23ª and 23ᵇ is a chain provided with extended hook members 23ᵉ which are of conventional form of conveyer for conducting the hay upwardly and inwardly on the front portion of the plate 2.

The back contracted portion between the plates 1 and 2 is open at the side and back ends and provided with supports 2ᶜ to hold them in certain relation to each other, provided with a nut 2ᶠ on the opposite sides of the plates 1 and 2. The sides are provided with three holes on each side with tension springs adapted to permit the wire to pass through and the pressing of the hay into this contracted portion, carries the wire with it. After a sufficient quantity of hay is compressed in the narrow contracted portion at the rear end, the bale is tied in the usual manner and released.

In order to prevent additional hay from entering the contracted portion while the bale is being tied there are provided hay retarding members 29 and 30 which are bell cranks pivoted at the top sides and provided with a bar with prongs adapted to reciprocate inwardly and outwardly with the shifting of the bar 28 operated by the lever 27. In the upper plate 1 just back of the dogs 32 in the sides for preventing the backward movement of the hay is a slot 31 which is adapted to receive the block which is the conventional block for permitting the insertion of the tie wires at the sides provided with three grooves on opposite sides adapted for the wire to pass through.

Though I have shown and described a particular construction, combination and arrangement of parts and portions I do not wish to be limited to this particular construction, combination, and arrangement but desire to include in the scope of my invention the construction, combination and arrangement substantially as set forth in the appended claims.

It is obvious that with this construction there is provided a hay baling press which automatically picks up the hay from the ground or from the windrow and conducts and presses the same into a compact form; that the apparatus is self-propelled, and that the engine forms a unit power system for traction purposes and for operating the various parts for conducting the hay and pressing the same into the proper form; that the hay is picked up from the ground by means of the rake teeth 8 and passes upwardly and is caught with the conveyers 23 and carried upwardly on the plate 2 to where it is engaged by means of the packing members 25 which are reciprocated by the gears 14 which compacts the hay into the narrow compressed back end portion carrying with it wires in loop form after which it is tied in the usual manner.

Having thus described my invention what

I claim as new and desire to secure by Letters Patent is:

1. A hay baling press, including a self-propelled frame with a hollow backwardly converging wall compartment, rake teeth pivotally mounted on and extending forwardly from the front entrance of said compartment, conveyers in said compartment adapted to conduct the hay backwardly from said rake teeth, packing members on opposite sides spaced apart and operated on an angle so that the hay passes between said packing members adapted to engage the hay on opposite sides taken from said conveyers and packed into a narrow compact portion of said compartment, means for automatically operating said conveyers and said packers with the movement of said self-propelled frame and manually operated means for checking the movement of said hay in its backward movement.

2. A hay baling press, including a self-propelled frame with a hollow backwardly converging wall compartment, rake teeth pivotally mounted on and extending forwardly from the front entrance of said compartment, conveyers in said compartment adapted to conduct the hay backwardly from said rake teeth and packing members on opposite sides adapted to engage the hay on opposite sides taken from said conveyers and packed into a narrow compact portion of said compartment, means for automatically operating said conveyers and said packers with the movement of said self-propelled frame, manually operated means for checking the movement of said hay in its backward movement and means for raising and lowering the extended end of said rake.

3. A hay baling press, including a self-propelled frame with a hollow backwardly converging wall compartment, rake teeth pivotally mounted on and extending forwardly from the front entrance of said compartment, conveyers in said compartment adapted to conduct the hay backwardly from said rake teeth, packing members on opposite sides adapted to engage the hay on opposite sides taken from said conveyers and packed into a narrow compact portion of said compartment, means for automatically operating said conveyers and said packers with the movement of said hay in its backward movement, manually operated means for raising and lowering the extended end of said rake, comprising an arm secured to the axis of said rake, a rod extending therefrom pivotally connected thereto, a bell crank positioned on said frame, with one member connecting with said rod, another rod pivotally connected with the other member of said bell crank and its opposite end connected with a hand lever.

4. A hay baling press, including a self-propelled vehicle provided with an open end box thereon with its walls converging backwardly, a rake pivotally connected to the front end of said vehicle adapted to conduct hay from the ground into the open end of said vehicle box, conveyers mounted in the lower side of said box extending therethrough adapted to conduct the hay backwardly in said box and packer members adapted to engage said hay and pack it backwardly into a contracted portion of said box, means for automatically and simultaneously operating said vehicle, conveyers, and packers and means for checking the movement of said hay backwardly operated manually.

5. A hay baling press, including a self-propelled vehicle provided with an open end box thereon with its walls converging backwardly, a rake pivotally connected to the front end of said vehicle adapted to conduct hay from the ground into the open end of said vehicle box, conveyers mounted on the lower side of said box extending therethrough adapted to conduct the hay backwardly in said box and packer members adapted to engage said hay and pack it backwardly into a contracted portion of said box, means for automatically and simultaneously operating said vehicle, conveyers, and packers, means for checking the movement of said hay backwardly operated manually and means for supporting a baling wire under tension within said box for tying the bales in the conventional manner.

In testimony whereof, I have hereunto set my hand at San Diego, California, this 29th day of August, 1921.

HALL M. THEOBALD.